Dec. 24, 1940. H. B. LODGE 2,226,005
DRILL GUIDE
Filed May 8, 1939
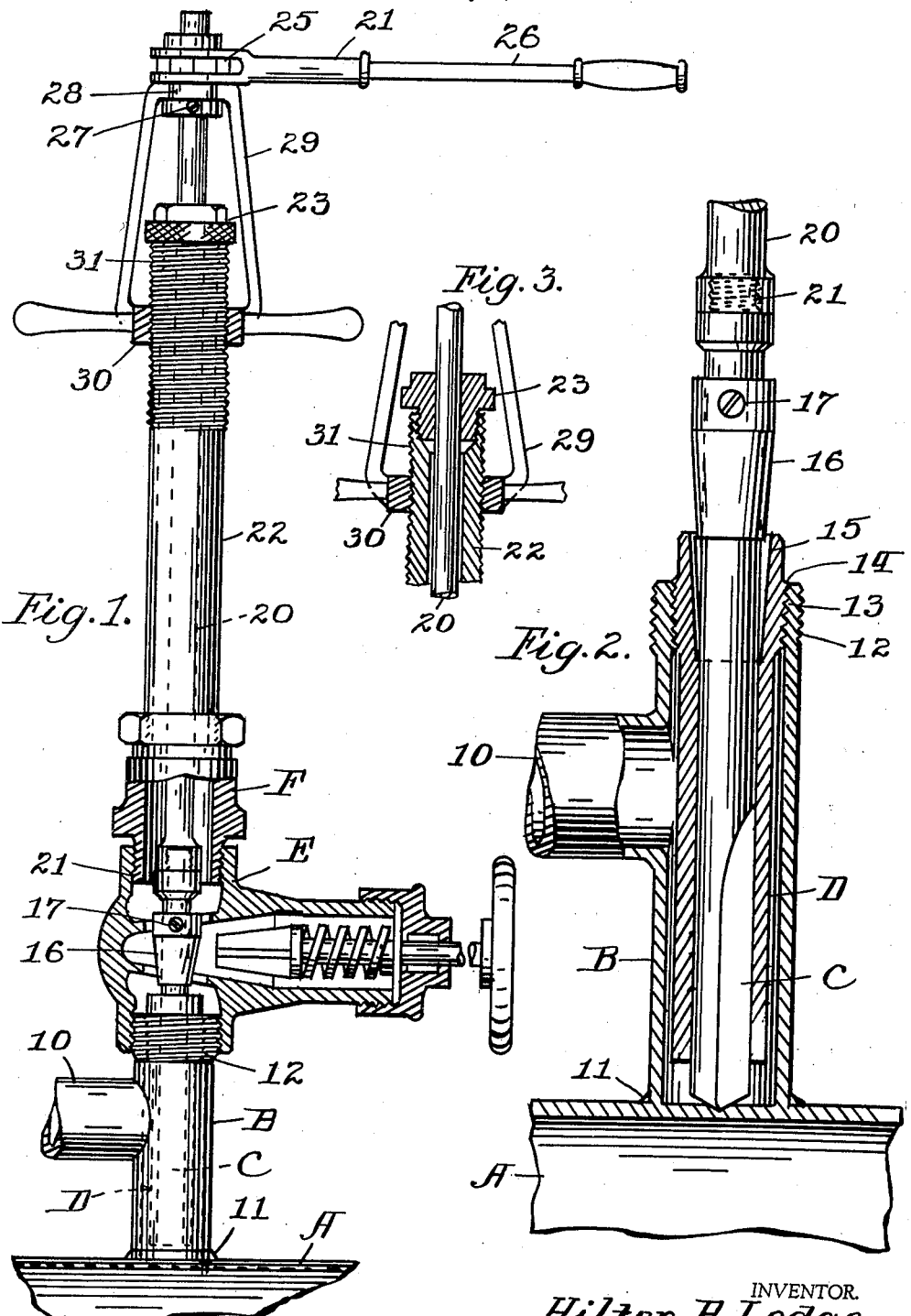
INVENTOR.
Hilton B. Lodge
BY
ATTORNEY.

Patented Dec. 24, 1940

2,226,005

UNITED STATES PATENT OFFICE 2,226,005

DRILL GUIDE

Hilton B. Lodge, Compton, Calif.

Application May 8, 1939, Serial No. 272,303

1 Claim. (Cl. 77—37)

My invention relates to improvements in drill guides and more particularly to that type by which pipes may be tapped to conduct gas or other fluid or liquid therefrom without allowing the escape of fluid or liquid during and after the operation of drilling and removing the drill.

It has been found hazardous to tap gas mains due to the escape of gas which frequently ignites and results in bodily injury. By the use of my invention this danger is reduced to a minimum. Also in connection with the tapping of oil and water mains under pressure loss of liquid is prevented by the use of my invention. A further object is to tap the main so that when desired a plug can subsequently be inserted to completely stop the flow of fluid or liquid substantially without any leaking or loss. Among further objects are simplicity of construction and greater effectiveness in use. My invention provides an inexpensive device for tapping gas mains when under gas pressure without the loss of gas and when pipes are too thin for cutting threaded openings therein.

In the accompanying drawing forming part of this specification, Fig. 1 is an elevation partly in central vertical section showing my improved tapping device in position for use; Fig. 2 is an enlarged central vertical section of a portion of the structure shown in Fig. 1, showing the T pipe coupling on the gas main and the drill and drill guide therein in position to start drilling, and Fig. 3 is a vertical section of a detail taken on the line 3—3 of Fig. 1, and showing the packing gland between the drill shaft and drill shaft chamber.

In the drawing, A indicates a pipe main which it is desired to tap for conducting gas or other fluid or liquid. B indicates a pipe coupling which may be of T type or any other form having a branch take off 10 or without a branch. This coupling is shown secured with its longitudinal axis at right angles on the side of the main by welding one of its ends at 11 to the outer surface of the main. The outermost end of this coupling has a male coupling screw thread 12 and an inwardly tapering female coupling screw thread 13. The means for tapping the main A consists of a drill tap C which is also commonly termed a twist drill. To guide the drill and hold it truely centered on its normal axis to its work and prevent any deflection I provide a long sleeve D which extends into and is held on the coupling and terminates near the inner end thereof in close proximity to the main. The drill is closely fitted to revolve and slide freely in the bore of the sleeve and the sleeve is removably connected with but rigidly supported on the coupling by threaded engagement with the female screw thread 13. Thus the guide sleeve D has an inwardly tapering male thread 14 which meshes with the female thread 13. The outer end of the guide sleeve also is provided with a conical inner friction clutch surface 15 for cooperation with a friction clutch cone 16 on the shank of the drill bit for purposes to be hereinafter described. The sleeve D functions as a guide for the bit and holds the bit true to its work without any deflection and prevents the bit from what is commonly termed "sloughing off." The friction clutch cone 16 is slidable on the shank of the drill bit and is held in adjusted position to permit the required thrust movement of the bit by means of the set screw 17 or other suitable means.

In connection with the guide I provide, means for removing the bit and the guide from the coupling substantially without the escape of gas or other fluid or liquid except the amount trapped in the drill bit chamber, and the usual means for revolving and feeding the drill. E is a gate valve of usual construction secured at its inlet end by the thread 12 upon the outer end of the coupling and through which the drill bit is inserted through the guide sleeve when the valve is open. F is a nipple coupling threaded into the outlet end of the gate valve and through which a drive shaft 20 extends outwardly and is connected with the outer end of the drill C by the threaded connection 21. 22 is a tubular body threaded into the nipple F, through which the drill shaft extends and by which a drill chamber is formed. 23 is a stuffing box or gland on the outer end of the tubular body 22 and in which the shaft is revolubly held to prevent any fluid or liquid escaping from the drill chamber. The shaft 20 by which the drill bit is revolved may be driven by any suitable means, that shown being the usual hand operable ratchet 25 and ratchet operating handle 26. The ratchet is removably secured to the drill shaft 20 by means of the set screw 27 or other suitable means and is formed with a collar 28 in which a feed yoke 29 is revolubly secured. This feed yoke has a plurality of arms extending downwardly and terminating in a collar 30 which is screw threaded at 31 upon the outer surface of the tubular body 22. Thus by turning the yoke the shaft can be reciprocated longitudinally and the drill bit fed downwardly by hand to drill through the wall of the main or can be raised. After drilling through the wall of the main the drill shaft and the drill may be engaged by the clutch members with the drill guide D to unscrew and lift the guide with the drill through the valve after loosening the set screw 27 and thrusting the shaft by hand downwardly until the friction clutch 16 engages and adheres to its companion member 15 whereupon the drill with the guide member can be raised. When fully raised into superior position the drill and guide enter the drill chamber in the tubular body 22 of the valve and the valve may then be closed and the nipple removed from the valve leaving the valve free to be coupled with any desired supply duct (not shown) for conducting fluid or liquid from the main.

After drilling the main and unscrewing the guide by reversing the rotation of the drill shaft the guide and drill are simultaneously raised above the gate valve and the latter closed. The drilling apparatus can than be removed by unscrewing the nipple from the valve thus leaving the valve free to be connected with any suitable branch duct. If it is desired at any time to plug the opening previously drilled in the main the drilling apparatus is again applied only instead of the drill a plug is substituted of the proper diameter and applied to the opening by the drill shaft in the usual manner. Due to the hole having been drilled accurately on center by my improvement the plug will seat tightly whereas if not on center which heretofore has usually occurred the plug will not seat tightly and thus leak which is objectionable. The clutch between the guide and drill shank is of conical friction type but may be of any other construction desired within the scope and spirit of the invention.

By my improvement the amount of power required to revolve the bit is reduced due to the guide holding the drill true to its work without binding. Wear of the parts is reduced to a minimum and breakage is prevented due to the nonbinding effect. If desired a center punch can be applied through the guide for starting the drill on center but I have found in general practice that the application of a punch is not necessary. The space adjoining the drill and its work allows drillings to accumulate without effecting the efficiency of operation of the drill.

In accordance with the patent statutes, I have described the principles of operation of my invention together with the construction thereof which I now consider to represent the best embodiment thereof but I desire to have it understood that the structure shown is only illustrative and that the invention can be carried out by other means and applied to uses other than those above set forth within the scope of the following claim.

I claim:

A device for tapping pipes and conducting fluid and liquid under pressure therefrom, comprising, a coupling adapted to be secured to a pipe, a drill guide sleeve projecting into said coupling terminating near the wall of said pipe separably attached at its outer end to the coupling by a threaded connection and having a driven clutch member near its outer end, a valve attached to the outer end of said coupling, a drill longitudinally and rotatively held by said sleeve having a drive shaft extending outwardly, a sealed shaft chamber through which the shaft extends and is rotatable detachably secured to said valve and into which said drill and sleeve are outwardly receivable, a clutch driving member on said shaft adapted to engage the driven clutch member on said sleeve after the drill bores into the pipe to engage, unscrew and remove the sleeve outwardly from the coupling through said valve and into said shaft chamber, and means for revolving said shaft.

HILTON B. LODGE.